U. BEEBE.
Machine for Conveying Straw from Thrashing Machines.
No. 663. Patented March 28, 1838.
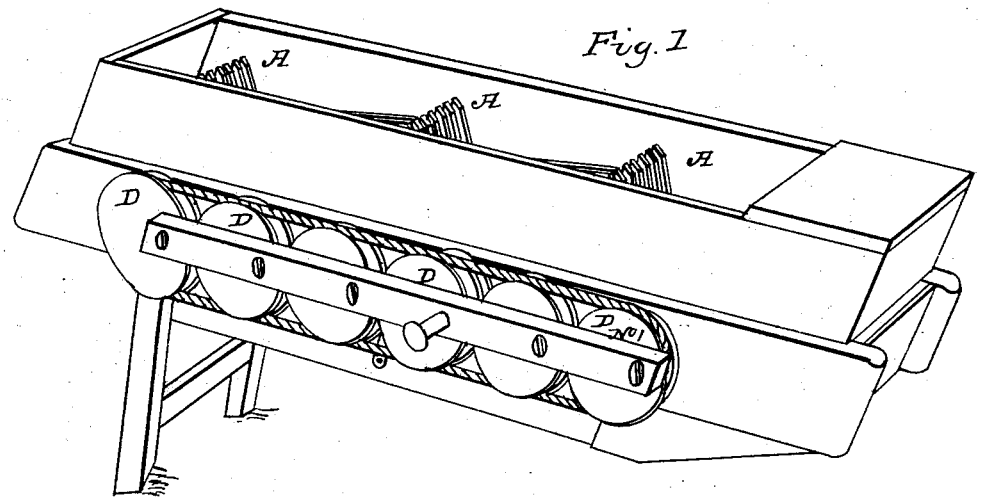
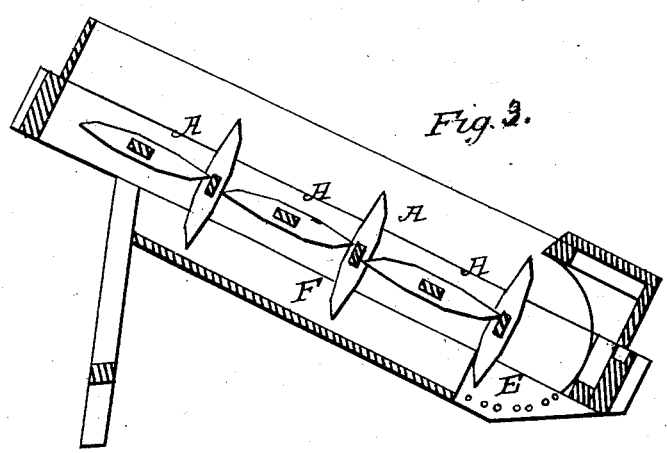
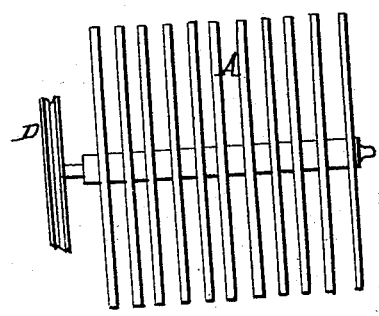

UNITED STATES PATENT OFFICE.

URIAH BEEBE, OF CLARENDON, NEW YORK.

MACHINE FOR CONVEYING STRAW FROM THRESHING-MACHINES.

Specification of Letters Patent No. 663, dated March 28, 1838.

*To all whom it may concern:*

Be it known that I, URIAH BEEBE, of Clarendon, in the county of Orleans and State of New York, have invented a new and improved mode of carrying straw from the cylinder of a threshing-machine any distance at the pleasure of the employer; and I do hereby declare that the following is a full and exact description.

The nature of my invention consists in carrying the straw from the cylinder of a threshing machine by a set of revolving rakers of any given number comprised of several wings which form one complete sheet of screen placed in a frame which when set in motion by being attached to what is called the horse or water power of a threshing machine will carry the straw to any place designed, leaving the grain to pass through a small screen made for that purpose near the place where it first falls in.

To enable others skilled in the art to make and use my invention I will proceed to describe its construction and operation.

The teeth in each wing raker I make about eighteen inches in length, half of an inch in thickness, two inches in width and taper to the edge from the center each way so as to leave the point of each tooth nearly square. I make a mortise hole in the middle of the tooth so as to admit of a shaft of sufficient strength to carry the teeth with safety, each tooth I place upon the shaft at an equal distance as seen on the plate marked letter A, so as to admit of the passage of the second wing raker in the clear on the principle of the teeth, being so arranged as to mash through each other when performing their revolutions, as seen on the plate marked letters A Fig. 1. Each shaft I make of three pieces of timber, a gain should be cut to accommodate the thickness and distance of each tooth in the two outside pieces of the shaft and to fasten and complete the same and to hold the teeth firm the third piece of the shaft must be driven through the center, on the ends of each shaft I leave a gudgeon and upon one of these gudgeons I place a whirr (as seen on the plate marked Fig. 1) for the reception of a band as seen on the plate marked by letters D, the third or center whirr or wheel marked by letter C is made double or thicker so as to receive another band for the purpose of attaching the same to the horse or water power of the threshing machine and in order that all the whirrs or wheels marked letters D receive an equal motion with the one marked letter C, a straight strip of board is placed upon the outside of all the whirrs and attached to each whirr by a single screw which serves as crank to put the whole in motion. It is to be understood that the screen rakers thus organized are placed in a frame of light timbers or scantling on a straight line at a distance from each other so that the ends of the teeth of each wing of the rake shall pass and just clear the shaft of the other when in motion; upon the top of the frame or scantling I place a hopper made of thin boards to rise above the length of the teeth of the rakers to prevent the straw from falling off before it is carried to the place designed. At the bottom of the frame I also place another hopper so as to barely clear the length of teeth and place an apron of thin boards upon its surface for the express purpose of catching the short straws which fall between the teeth of the screen rakers (in their revolution) which is immediately caught again by the rakers and carried back for a second passage. The apron F commences in the center between the two last wings of the rakers and extends down near the center of the first whirr marked No. 1 on the plate at which place a wire screen E Fig. 3 is affixed as a substitute for the apron for the purpose of letting the grain fall through; the screen is placed in a concave form following the revolution of the first raker to a half circle; the lower third of the half circle is only to be regarded as the screen, the upper part may be covered with boards sheet iron or tin.

What I claim as my invention, and desire to secure by Letters Patent, is—

The mode and principle of carrying the straw with all its appendages as described in the above with the privilege of setting the screen rakers fine or coarse large or small few or many.

URIAH BEEBE.

Witnesses:
JOHN MILLARD,
JOSIAH GRAVES, Jr.